United States Patent
Liu et al.

(10) Patent No.: US 9,980,261 B2
(45) Date of Patent: May 22, 2018

(54) METHODS FOR DETECTING AND SENDING DOWNLINK CONTROL INFORMATION AND DEVICES

(71) Applicant: Huawei Technologies Co., Ltd., Shenzhen, Guangdong (CN)

(72) Inventors: Kunpeng Liu, Beijing (CN); Chi Gao, Shenzhen (CN); Jianghua Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 126 days.

(21) Appl. No.: 14/972,864

(22) Filed: Dec. 17, 2015

(65) Prior Publication Data

US 2016/0105875 A1  Apr. 14, 2016

Related U.S. Application Data

(63) Continuation of application No. PCT/CN2013/077396, filed on Jun. 18, 2013.

(51) Int. Cl.
*H04W 72/04* (2009.01)
*H04W 48/16* (2009.01)
(Continued)

(52) U.S. Cl.
CPC ......... *H04W 72/042* (2013.01); *H04L 5/0023* (2013.01); *H04L 5/0048* (2013.01);
(Continued)

(58) Field of Classification Search
CPC . H04W 72/042; H04W 74/006; H04W 48/16; H04W 28/18; H04W 72/12;
(Continued)

(56) References Cited

U.S. PATENT DOCUMENTS

| 2013/0028108 A1* | 1/2013 | Wu | H04L 5/001 370/252 |
| 2013/0039284 A1* | 2/2013 | Marinier | H04L 5/001 370/329 |

(Continued)

FOREIGN PATENT DOCUMENTS

| CN | 101764776 A | 6/2010 |
| CN | 102055709 A | 5/2011 |
| CN | 102711251 A | 10/2012 |

OTHER PUBLICATIONS

NTT Docomo, "Control Signaling to Support Enhanced DL MIMO", Oct. 11-15, 2010, 3GPP, 3GPP TSG RAN WG1 Meeting #62bis Xian, China, R1-105435.*

(Continued)

*Primary Examiner* — Paul H Masur
*Assistant Examiner* — Michael Phillips

(57) ABSTRACT

Embodiments of the present invention provide methods for detecting and sending downlink control information and devices. The method for detecting downlink control information includes: acquiring a pilot port determining parameter that corresponds to downlink control information needing to be detected; determining, according to the pilot port determining parameter, a first-type pilot port that corresponds to the downlink control information; and detecting the downlink control information according to the first-type pilot port. In the embodiments of the present invention, user equipment can correctly detect downlink control information.

18 Claims, 5 Drawing Sheets

(51) Int. Cl.
*H04W 74/00* (2009.01)
*H04L 5/00* (2006.01)

(52) U.S. Cl.
CPC .......... *H04L 5/0053* (2013.01); *H04W 48/16* (2013.01); *H04W 74/006* (2013.01)

(58) Field of Classification Search
CPC ............. H04W 72/1289; H04L 5/0023; H04L 5/0053; H04L 5/0048; H04L 5/0094; H04L 5/0051; H04L 5/0092; H04L 5/005; H04L 5/0091
See application file for complete search history.

(56) References Cited

U.S. PATENT DOCUMENTS

| | | | | |
|---|---|---|---|---|
| 2013/0044727 | A1* | 2/2013 | Nory | H04L 5/0092 370/330 |
| 2013/0121304 | A1 | 5/2013 | Nory et al. | |
| 2014/0198720 | A1* | 7/2014 | Gaal | H04W 72/04 370/328 |
| 2014/0307646 | A1* | 10/2014 | Chen | H04W 72/02 370/329 |
| 2015/0223216 | A1* | 8/2015 | Han | H04W 72/044 370/329 |
| 2015/0236828 | A1* | 8/2015 | Park | H04L 5/0094 375/340 |

OTHER PUBLICATIONS

"Remaining aspects of PUCCH resource allocation", Alcatel-Lucent Shanghai Bell, 3GPP TSG RAN WG1 Meeting #70, Aug. 13-17, 2012, 4 pages, R1-123846.

"Details of EPDCCH antenna port association", Renesas Mobile Europe Ltd., 3GPP TSG-RAN WG1 Meeting #71, Nov. 12-16, 2012, 5 pages, R1-125056.

* cited by examiner

METHODS FOR DETECTING AND SENDING DOWNLINK CONTROL INFORMATION AND DEVICES

CROSS-REFERENCE TO RELATED APPLICATIONS

This application is a continuation of International Application No. PCT/CN2013/077396, filed on Jun. 18, 2013, which is hereby incorporated by reference in its entirety.

TECHNICAL FIELD

Embodiments of the present invention relate to communications technologies, and in particular, to methods for detecting and sending downlink control information and devices.

BACKGROUND

A multi-user multiple-input multiple-output (Multiple Input Multiple Output, MIMO for short) technology can suppress channel fading, so that a capacity, a coverage range, and spectrum utilization of a channel can be improved greatly.

A MIMO system improves the spectrum utilization by using spatial multiplexing. For example, at a transmit end, for a high-speed data stream, the high-speed data stream is made into several data substreams according to series/parallel change of a quantity of transmit antennas, then the data substreams are encoded separately, and the data substreams are transmitted by using enhanced control channel elements. One data substream corresponds to at least one enhanced control channel element, which is used to transmit the data substreams to form multi-layer transmission in space, where a quadrature modulation manner is used between layers to avoid co-channel interference, and then the data substreams are transmitted by using a transmit antenna. At a receive end, blind detection is performed based on a pilot port.

However, in the prior art, data streams of various layers in multi-layer transmission use a same pilot port, channel estimation cannot be correctly performed when data of multiple layers corresponds to a same port, causing that user equipment cannot correctly perform blind detection on downlink control information.

SUMMARY

Embodiments of the present invention provide methods for detecting and sending downlink control information and devices, which are used to make user equipment correctly detect downlink control information.

According to a first aspect, an embodiment of the present invention provides a method for detecting downlink control information, including:

acquiring a pilot port determining parameter that corresponds to downlink control information needing to be detected;

determining, according to the pilot port determining parameter, a first-type pilot port that corresponds to the downlink control information; and detecting the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

With reference to the first aspect, in a first possible implementation manner of the first aspect, the format of the downlink control information is one of at least one candidate format of the downlink control information; and the carrier index is an index of a carrier scheduled by using the downlink control information.

With reference to the first aspect or the first possible implementation manner of the first aspect, in a second possible implementation manner of the first aspect, the pilot port determining parameter is determined according to the format of the downlink control information, and the method includes:

determining a type of the downlink control information according to the format of the downlink control information; and determining the pilot port determining parameter according to the type of the downlink control information, where at least two different types of downlink control information correspond to different pilot port determining parameters.

With reference to the second possible implementation manner of the first aspect, in a third possible implementation manner of the first aspect, the type of the downlink control information includes a type of uplink scheduling control information and a type of downlink scheduling control information; or the type of the downlink control information includes a type of common control information and a type of user specific control information.

With reference to the first aspect or the first possible implementation manner of the first aspect, in a fourth possible implementation manner of the first aspect, the pilot port determining parameter is determined according to the format of the downlink control information, and the method includes:

acquiring a quantity of bits of the downlink control information according to the format of the downlink control information; and determining the pilot port determining parameter according to the quantity of bits of the downlink control information.

With reference to the fourth possible implementation manner of the first aspect, in a fifth possible implementation manner of the first aspect, there are at least two pieces of downlink control information needing to be detected, and the determining the pilot port determining parameter according to the quantity of bits of the downlink control information includes:

determining a size relationship between quantities of bits included in the at least two pieces of downlink control information; and determining the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

With reference to the first aspect or any one of the first to the fifth possible implementation manners of the first aspect, in a sixth possible implementation manner of the first aspect, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

With reference to the first aspect or the first to the sixth possible implementation manners of the first aspect, in a seventh possible implementation manner of the first aspect, the configuration information of the second-type pilot includes any one or a combination of the following:

a quantity of ports for the second-type pilot;
power information of the second-type pilot;
a subframe offset at a moment when the second-type pilot is sent; and
a subframe period at the moment when the second-type pilot is sent.

With reference to the first aspect or the first to the seventh possible implementation manners of the first aspect, in an eighth possible implementation manner of the first aspect, the second-type pilot is a channel state information reference signal or a common pilot signal.

With reference to the first aspect or the first to the eighth possible implementation manners of the first aspect, in a ninth possible implementation manner of the first aspect, the resource configuration information of the downlink control information includes any one or a combination of the following:

a size of a time-frequency resource of the downlink control information;
a time domain position of a resource of the downlink control information;
a frequency domain position of the resource of the downlink control information; and
precoding information used by the downlink control information.

With reference to the first aspect or the first to the ninth possible implementation manners of the first aspect, in a tenth possible implementation manner of the first aspect, the determining, according to the pilot port determining parameter, a first-type pilot port that corresponds to the downlink control information includes:

determining, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

According to a second aspect, an embodiment of the present invention provides a method for sending downlink control information, including:

acquiring a pilot port determining parameter that corresponds to downlink control information;

determining, according to the pilot port determining parameter, a first-type pilot port that corresponds to the downlink control information; and sending the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

With reference to the second aspect, in a first possible implementation manner of the second aspect, the format of the downlink control information is one of at least one candidate format of the downlink control information; and the carrier index is an index of a carrier scheduled by using the downlink control information.

With reference to the second aspect or the first possible implementation manner of the second aspect, in a second possible implementation manner of the second aspect, the pilot port determining parameter is determined according to the format of the downlink control information, and the method includes:

determining a type of the downlink control information according to the format of the downlink control information; and determining the pilot port determining parameter according to the type of the downlink control information, where at least two different types of downlink control information correspond to different pilot port determining parameters.

With reference to the second possible implementation manner of the second aspect, in a third possible implementation manner of the second aspect, the type of the downlink control information includes a type of uplink scheduling control information and a type of downlink scheduling control information; or the type of the downlink control information includes a type of common control information and a type of user specific control information.

With reference to the second aspect or the first possible implementation manner of the second aspect, in a fourth possible implementation manner of the second aspect, the pilot port determining parameter is determined according to the format of the downlink control information, and the method includes:

acquiring a quantity of bits of the downlink control information according to the format of the downlink control information; and determining the pilot port determining parameter according to the quantity of bits of the downlink control information.

With reference to the fourth possible implementation manner of the second aspect, in a fifth implementation manner of the second aspect, there are at least two pieces of downlink control information needing to be detected, and the determining the pilot port determining parameter according to the quantity of bits of the downlink control information includes:

determining a size relationship between quantities of bits included in the at least two pieces of downlink control information; and determining the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

With reference to the second aspect or the first to the fifth possible implementation manners of the second aspect, in a sixth possible implementation manner of the second aspect, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

With reference to the second aspect or the first to the sixth possible implementation manners of the second aspect, in a seventh possible implementation manner of the second aspect, the configuration information of the second-type pilot includes any one or a combination of the following:

a quantity of ports for the second-type pilot;
power information of the second-type pilot;
a subframe offset at a moment when the second-type pilot is sent; and
a subframe period at the moment when the second-type pilot is sent.

With reference to the second aspect or the first to the seventh possible implementation manners of the second aspect, in an eighth possible implementation manner of the second aspect, the second-type pilot is a channel state information reference signal or a common pilot signal.

With reference to the second aspect or the first to the eighth possible implementation manners of the second aspect, in a ninth possible implementation manner of the second aspect, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

With reference to the second aspect or the first to the ninth possible implementation manners of the second aspect, in a tenth possible implementation manner of the second aspect, the determining, according to the pilot port determining parameter, a first-type pilot port that corresponds to the downlink control information includes:

determining, according to a formula (1) or a formula (2), a port index of the first-type pilot port that corresponds to the downlink control information, where the formula (1) is:

$$n_1'=n_{ECCE,low} \bmod N_{RB}^{ECCE}+(n_{RNTI}+\Delta)\bmod \min(N_{EPDCCH}^{ECCE},N_{RB}^{ECCE}), \quad (1); and$$

the formula (2) is:

$$n_1'=(n_0'+\Delta)\bmod \min(N_{EPDCCH}^{ECCE},N_{RB}^{ECCE}), \quad (2); where$$

$n_0'=n_{ECCE,low} \bmod N_{RB}^{ECCE}+(n_{RNTI})\bmod \min(N_{EPDCCH}^{ECCE},N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

According to a third aspect, an embodiment of the present invention provides user equipment, including:

an acquiring module, configured to acquire a pilot port determining parameter that corresponds to downlink control information needing to be detected;

a port determining module, configured to determine, according to the pilot port determining parameter, a first-type pilot port that corresponds to the downlink control information; and a detecting module, configured to detect the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

With reference to the third aspect, in a first possible implementation manner of the third aspect, the format of the downlink control information is one of at least one candidate format of the downlink control information; and the carrier index is an index of a carrier scheduled by using the downlink control information.

With reference to the third aspect or the first possible implementation manner of the third aspect, in a second possible implementation manner of the third aspect, the user equipment further includes: a first parameter determining module, configured to: when the pilot port determining parameter is determined according to the format of the downlink control information, determine a type of the downlink control information according to the format of the downlink control information; and determine the pilot port determining parameter according to the type of the downlink control information, where at least two different types of downlink control information correspond to different pilot port determining parameters.

With reference to the second possible implementation manner of the third aspect, in a third possible implementation manner of the third aspect, the type of the downlink control information includes a type of uplink scheduling control information and a type of downlink scheduling control information; or the type of the downlink control information includes a type of common control information and a type of user specific control information.

With reference to the third aspect or the first possible implementation manner of the third aspect, in a fourth possible implementation manner of the third aspect, the user equipment further includes: a second parameter determining module, configured to: when the pilot port determining parameter is determined according to the format of the downlink control information, acquire a quantity of bits of the downlink control information according to the format of the downlink control information; and determine the pilot port determining parameter according to the quantity of bits of the downlink control information.

With reference to the fourth possible implementation manner of the third aspect, in a fifth possible implementation manner of the third aspect, the second parameter determining module is further specifically configured to: when there are at least two pieces of downlink control information needing to be detected, determine a size relationship between quantities of bits included in the at least two pieces of downlink control information; and determine the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

With reference to the third aspect or the first to the fifth possible implementation manners of the third aspect, in a sixth possible implementation manner of the third aspect, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

With reference to the third aspect or the first to the sixth possible implementation manners of the third aspect, in a seventh possible implementation manner of the third aspect, the configuration information of the second-type pilot includes any one or a combination of the following:

a quantity of ports for the second-type pilot;
power information of the second-type pilot;
a subframe offset at a moment when the second-type pilot is sent; and
a subframe period at the moment when the second-type pilot is sent.

With reference to the third aspect or the first to the seventh possible implementation manners of the third aspect, in an eighth possible implementation manner of the third aspect, the second-type pilot is a channel state information reference signal or a common pilot signal.

With reference to the third aspect or the first to the eighth possible implementation manners of the third aspect, in a ninth possible implementation manner of the third aspect, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

With reference to the third aspect or the first to the ninth possible implementation manners of the third aspect, in a tenth possible implementation manner of the third aspect, the port determining module is specifically configured to:

determine, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI}+\Delta) \bmod \min(N_{EPDCCH}^{ECCE}, N_{RB}^{ECCE}), \quad (1); \text{ and}$$

the formula (2) is:

$$n_1' = (n_0'+\Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

According to a fourth aspect, an embodiment of the present invention provides a base station, including:

an acquiring module, configured to acquire a pilot port determining parameter that corresponds to downlink control information;

a port determining module, configured to determine, according to the pilot port determining parameter, a first-type pilot port that corresponds to the downlink control information; and a sending module, configured to send the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

With reference to the fourth aspect, in a first possible implementation manner of the fourth aspect, the format of the downlink control information is one of at least one candidate format of the downlink control information; and the carrier index is an index of a carrier scheduled by using the downlink control information.

With reference to the fourth aspect or the first possible implementation manner of the fourth aspect, in a second possible implementation manner of the fourth aspect, the base station further includes: a first parameter determining module, configured to: when the pilot port determining parameter is determined according to the format of the downlink control information, determine a type of the downlink control information according to the format of the downlink control information; and determine the pilot port determining parameter according to the type of the downlink control information, where at least two different types of downlink control information correspond to different pilot port determining parameters.

With reference to the second possible implementation manner of the fourth aspect, in a third possible implementation manner of the fourth aspect, the type of the downlink control information includes a type of uplink scheduling control information and a type of downlink scheduling control information; or the type of the downlink control information includes a type of common control information and a type of user specific control information.

With reference to the fourth aspect or the first possible implementation manner of the fourth aspect, in a fourth possible implementation manner of the fourth aspect, the base station further includes: a second parameter determining module, configured to: when the pilot port determining parameter is determined according to the format of the downlink control information, acquire a quantity of bits of the downlink control information according to the format of the downlink control information; and determine the pilot port determining parameter according to the quantity of bits of the downlink control information.

With reference to the fourth possible implementation manner of the fourth aspect, in a fifth possible implementation manner of the fourth aspect, the second parameter determining module is further specifically configured to: when there are at least two pieces of downlink control information needing to be detected, determine a size relationship between quantities of bits included in the at least two pieces of downlink control information; and determine the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

With reference to the fourth aspect or the first to the fifth possible implementation manners of the fourth aspect, in a sixth possible implementation manner of the fourth aspect, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

With reference to the fourth aspect or the first to the sixth possible implementation manners of the fourth aspect, in a seventh possible implementation manner of the fourth aspect, the configuration information of the second-type pilot includes any one or a combination of the following:

a quantity of ports for the second-type pilot;

power information of the second-type pilot;

a subframe offset at a moment when the second-type pilot is sent; and a subframe period at the moment when the second-type pilot is sent.

With reference to the fourth aspect or the first to the seventh possible implementation manners of the fourth aspect, in an eighth possible implementation manner of the fourth aspect, the second-type pilot is a channel state information reference signal or a common pilot signal.

With reference to the fourth aspect or the first to the eighth possible implementation manners of the fourth aspect, in a ninth possible implementation manner of the fourth aspect, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

With reference to the fourth aspect or the first to the ninth possible implementation manners of the fourth aspect, in a tenth possible implementation manner of the fourth aspect, the port determining module is specifically configured to:

determine, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

According to a fifth aspect, an embodiment of the present invention provides user equipment, including a processor and a memory, where the memory stores an execution instruction; and when the user equipment runs, the processor communicates with the memory, and the processor executes the execution instruction so that the user equipment performs the method according to the first aspect or any one of the first to the tenth possible implementation manners of the first aspect.

According to a sixth aspect, an embodiment of the present invention provides a base station, including a processor and a memory, where the memory stores an execution instruction; and when the base station runs, the processor communicates with the memory, and the processor executes the execution instruction to so that the base station performs the method according to the second aspect or any one of the first to the tenth possible implementation manners of the second aspect.

According to the methods for detecting and sending downlink control information and the devices provided in the embodiments of the present invention, in the method for detecting downlink control information, a pilot port determining parameter that corresponds to downlink control information needing to be detected is acquired, and a first-type pilot port that corresponds to the downlink control information is determined according to the pilot port determining parameter, that is, user equipment can determine different first-type pilot ports that correspond to multiple pieces of DCI transmitted on a time-frequency resource, and correctly detect the downlink control information according to the first-type pilot ports. Transmission is performed by using different ports, so that multiple pieces of DCI can be spatially multiplexed, thereby improving transmission efficiency.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
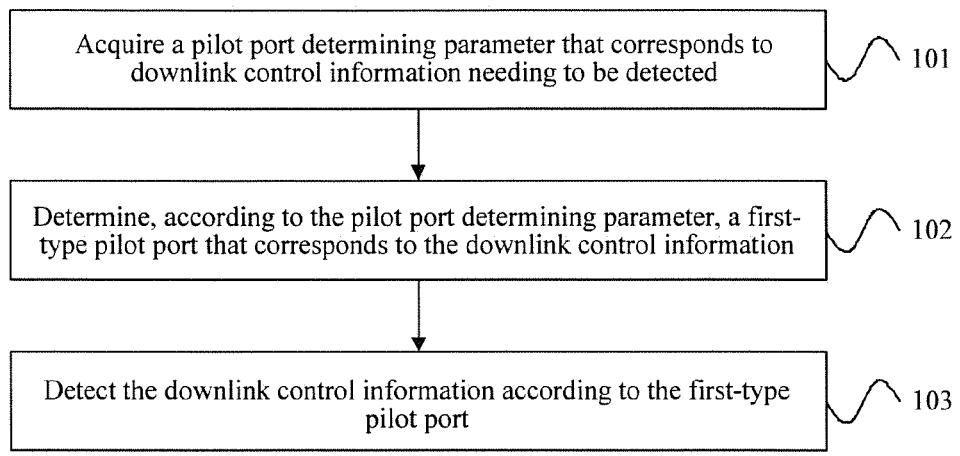
FIG. 1 is a schematic flowchart of Embodiment 1 of a method for detecting downlink control information according to the present invention.

FIG. 1 is a schematic flowchart of Embodiment 1 of a method for detecting downlink control information according to the present invention. This embodiment is performed by user equipment, and the user equipment may be implemented by using software and/or hardware. As shown in FIG. 1, the method in this embodiment may include:

Step 101: Acquire a pilot port determining parameter that corresponds to downlink control information needing to be detected.

Step 102: Determine, according to the pilot port determining parameter, a first-type pilot port that corresponds to the downlink control information.

Step 103: Detect the downlink control information according to the first-type pilot port.

In a Long Term Evolution (Long Term Evolution, LTE for short) system, a control channel element (Control Channel Element, CCE for short) serves as a component unit of a physical downlink control channel (Physical Downlink Control Channel, PDCCH for short), and each CCE is mapped onto a group of specific resource elements (Resource Element, RE for short) within a PDCCH area. The PDCCH may include one, two, four or eight CCEs, respectively corresponding to different encoding rates. Downlink control information is carried on the PDCCH.

Figure 2:
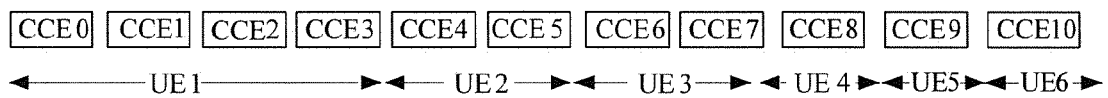
FIG. 2 is a schematic diagram showing that CCEs form PDCCHs of different user equipments according to an embodiment of the present invention.
Figure 3A:
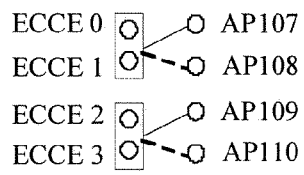
FIG. 3A is a schematic diagram 1 of pilot ports that correspond to ECCEs according to an embodiment of the present invention.
Figure 3B:
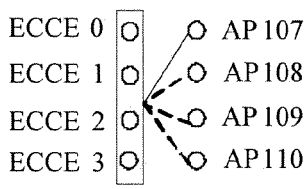
FIG. 3B is a schematic diagram 2 of pilot ports that correspond to ECCEs according to an embodiment of the present invention.

A base station determines, according to a channel condition of the user equipment, how many and which CCEs form a PDCCH for transmitting downlink control information (Downlink Control Information, DCI for short) of the user equipment. FIG. 2 is a schematic diagram showing that CCEs form PDCCHs of different user equipments according to this embodiment of the present invention. As shown in FIG. 2, CCE0 to CCE3 form a PDCCH of UE1, CCE4 and CCE5 form a PDCCH of UE2, CCE6 and CCE7 form a PDCCH of UE3, CCE8 forms a PDCCH of UE4, CCE9 forms a PDCCH of UE5, and CCE10 forms a PDCCH of UE6. A control channel element of an enhanced physical downlink control channel (Enhanced Physical Downlink Control channel, EPDCCH for short) is an enhanced control channel element (Enhanced Control Channel Element, ECCE for short), and in a transmission process, an ECCE uses a port that corresponds to the ECCE for transmission. For example, FIG. 3A is a schematic diagram 1 of pilot ports that correspond to ECCEs according to this embodiment of the present invention. As shown in FIG. 3A, when an aggregation level is 2, that is, when the EPDCCH is formed by aggregating two ECCEs, every two ECCEs correspond to one pilot port, where the pilot port refers to an antenna port (Antenna port, AP for short) used by a pilot. In this embodiment, for ease of description, ports such as AP107 and AP108 are directly referred to as a pilot port AP107, a pilot port 108, and the like. As shown in FIG. 3A, ECCE0 and ECCE1 correspond to the pilot port AP107 or AP108, and ECCE2 and ECCE3 correspond to a pilot port AP109 or AP110. FIG. 3B is a schematic diagram 2 of pilot ports that correspond to ECCEs according to this embodiment of the present invention. As shown in FIG. 3B, when an aggregation level is 4, that is, when the EPDCCH is formed by aggregating four ECCEs, every four ECCEs correspond to one pilot port, that is, ECCE0, ECCE1, ECCE2 and ECCE3 correspond to any one of pilot ports AP107, AP108, AP109 and AP110, other cases are similar, and details are not described herein again.

Before receiving or sending service data, the user equipment needs to learn DCI that is sent by the base station to the user equipment. However, before receiving the DCI, the user equipment does not clearly know on which EPDCCH candidate the DCI is carried; therefore, the user equipment needs to perform blind detection on possible EPDCCH candidates until an EPDCCH of the user equipment is detected. One EPDCCH candidate includes at least one ECCE.

Figure 4:
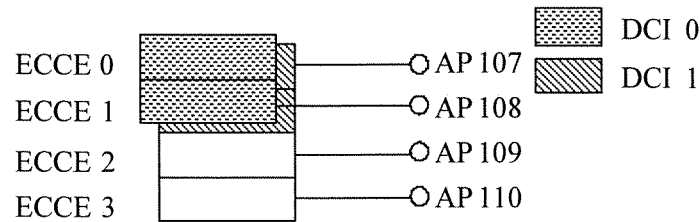
FIG. 4 is a schematic diagram showing that a base station transmits at multiple layers downlink control information of same user equipment according to an embodiment of the present invention.

In a specific implementation process, when the base station uses multi-layer transmission, the base station may transmit multiple pieces of DCI of a same user on time-frequency resources that correspond to a same ECCE. Specifically, as shown in FIG. 4, FIG. 4 is a schematic diagram showing that a base station transmits at multiple layers downlink control information of same user equipment according to an embodiment of the present invention. As shown in FIG. 4, ECCE0 and ECCE1 have two layers, and the base station transmits at multiple layers DCI0 and DCI1 of same UE.

In a specific implementation process, the base station and the user equipment determine a first-type pilot port by using a same method, where the base station sends downlink control information according to the first-type pilot port, and the user equipment detects the downlink control information according to the first-type pilot port. The user equipment determines, according to the method for detecting downlink control information provided in this embodiment, a specific correspondence between an ECCE and a first-type pilot port, and performs blind detection on downlink control information according to a specific first-type pilot port.

In step 101, the user equipment acquires the pilot port determining parameter that corresponds to the downlink control information needing to be detected, where the pilot port determining parameter is determined according to at least one of the following: a format of the downlink control information, a carrier index, configuration information of a second-type pilot, resource configuration information of the downlink control information, and a layer index of the downlink control information.

The format of the downlink control information is one of at least one candidate format of the downlink control information, and the at least one candidate format of the downlink control information includes: a DCI format 0, a DCI format 1, a DCI format 1A, a DCI format 2, a DCI format 3, a DCI format 3A, and the like. Different control information is transmitted in different formats. For example, uplink scheduling control information is transmitted in the DCI format 0, and downlink scheduling control information is transmitted in the DCI format 1. Different formats of the downlink control information correspond to different pilot port determining parameters, for example, for the DCI format 0, a corresponding pilot port determining parameter is 1, for the DCI format 1, a corresponding pilot port determining parameter is 2, and details are not described herein again in this embodiment.

The carrier index is an index of a carrier scheduled by using the downlink control information. In a scenario of carrier aggregation, there are at least two carriers, and each carrier has a number, that is, the carrier index. Different carrier indexes correspond to different pilot port determining parameters. For example, when control signaling of a local carrier schedules data of the local carrier, during detecting of a control channel of the local carrier, a pilot port determining parameter is obtained according to a carrier index of the local carrier, and further a pilot port that corresponds to the local carrier is determined, to detect the control channel. When cross-carrier scheduling is used, and when the local carrier detects and schedules a control channel of data of another carrier, a pilot port determining parameter needs to be obtained by using a carrier index of the another carrier, and further a pilot port that corresponds to the another carrier is determined, to detect the control channel.

A type of the second-type pilot is different from that of a first-type pilot, the first-type pilot may be a demodulation reference signal (Demodulation Reference Signal, DMRS for short), and the second-type pilot is specifically a channel state information reference signal (Channel State Information Reference signal, CSI-RS for short), or a common reference signal (Common Reference signal, CRS for short). The CSI-RS is a measurement pilot, and the common reference signal is a common pilot. The UE measures and feeds back channel quality information according to the CSI-RS, and the UE demodulates data or measures and feeds back channel quality information based on the CRS. When multiple transmission nodes simultaneously transmit control channels on a same time-frequency resource, that is, multiple control channels are spatially multiplexed, channel estimation can be performed on the control channels only when pilot ports of the control channels are different. Because different transmission nodes correspond to different CSI-RS configuration information, a correspondence between the CSI-RS configuration information and the first-type pilot may be set. In this way, a determining parameter of the first-type pilot port is obtained by using the CSI-RS configuration information of different transmission nodes, and further a corresponding pilot port is determined, to detect a control channel.

The resource configuration information of the downlink control information includes any one or a combination of the following: a size of a time-frequency resource of the downlink control information; a time domain position of a resource of the downlink control information; a frequency domain position of the resource of the downlink control information; and precoding information used by the downlink control information.

When sizes of configured time-frequency resources of downlink control channels are different, different pilot port deteimining parameters are used. A quantity of pilot ports used when the time-frequency resource of the downlink control channels is less than a specific threshold is greater than a quantity of pilot ports used when the time-frequency resource of the downlink control channel is greater than the specific threshold, for example, when the time-frequency resource of the downlink control channel is less than the specific threshold, four pilot ports, that is, pilot ports AP107, AP108, AP109 and AP110 are used for transmission; when the time-frequency resource of the downlink control channels is greater than the specific threshold, two pilot ports, that is, pilot ports AP107 and AP109 are used for transmission.

When configured time-frequency resource positions of downlink control channels are different, different pilot port determining parameters are used. When the time-frequency resource of the downlink control channel is at a central position in a frequency domain, four pilot ports, that is, pilot ports AP107, AP108, AP109 and AP110 are used for transmission.

When precoding matrices used by downlink control channels are different, different pilot port determining parameters are used. When the time-frequency resource of the downlink control channels is a collection C1, two pilot ports, that is, pilot ports AP107 and AP109 are used for transmission; when the time-frequency resource of the downlink control channels is a collection C2, two pilot ports, that is, pilot ports AP108 and AP110 are used for transmission.

When same downlink control information is transmitted by using multiple layers, different ports may be used for transmission at different layers. Specifically, the layer index of the downlink control information may have a correspondence with a port number, and different layer indexes correspond to different port numbers. For example, the downlink control information is transmitted by using two layers, and pilot ports that correspond to layer indexes 0 and 2 are the pilot port AP107 and the pilot port AP109 respectively. Transmitting the downlink control information by using three layers or four layers is similar to transmitting by using two layers, and details are not described herein again in this embodiment.

In a specific process of determining the pilot port determining parameter, when the user equipment receives multiple pieces of downlink control information on a same ECCE, the pilot port determining parameter may be determined according to any one of: the format of the downlink control information, the carrier index, the configuration information of the second-type pilot, the resource configuration information of the downlink control information, and the layer index of the downlink control information, and the pilot port determining parameter may also be determined by comprehensively considering a plural of the above. The pilot port determining parameter is an integer. It may be understood by persons skilled in the art that when there are multiple pieces of downlink control information received by the user equipment on a same ECCE, there are also multiple corresponding pilot port determining parameters with different values.

In an implementation manner of this embodiment, for example, the user equipment can determine the pilot port determining parameter according to the format of the downlink control information, the carrier index, and the like.

For example, for a control channel that needs to be detected, if a carrier index corresponding to the control channel is CC2, a pilot port determining parameter corresponding to the control channel is Δ1, the control channel transmits downlink scheduling control information, and a pilot port determining parameter corresponding to the downlink scheduling control information is Δ2; then the pilot port determining parameter is a function of Δ1 and Δ2, that is, Δ1+Δ2 or Δ1\*Δ2.

It may be understood by persons skilled in the art that, in a specific implementation process, the user equipment can determine the pilot port determining parameter according to any one of: the format of the downlink control information, the carrier index, the configuration information of the second-type pilot, the resource configuration information of the downlink control information, and the layer index of the downlink control information; when the user equipment determines the pilot port determining parameter according to a combination of the format of the downlink control information, the carrier index, and the configuration information of the second-type pilot, respective pilot port determining parameters may be separately obtained first, and then the pilot port determining parameters are added up to acquire a final pilot port determining parameter.

In step 102, the user equipment determines, according to the pilot port determining parameter, the first-type pilot port that corresponds to the downlink control information. The user equipment may calculate each pilot port determining parameter, to acquire a port index of the first-type pilot port, where the port index of the first-type pilot port has a correspondence with a port number of the first-type pilot port, and the port number of the first-type pilot port may be learned according to the correspondence.

In step 103, the user equipment performs blind detection on the downlink control information according to the first-type pilot port.

In a specific implementation process, the user equipment determines a first-type pilot port that corresponds to the downlink control information, performs channel estimation according to the corresponding first-type pilot port to obtain a channel coefficient, and demodulates and decodes the control channel, and further blind detection is performed on each physical downlink control channel candidate in a search region.

According to the method for detecting downlink control information provided in this embodiment of the present invention, a pilot port determining parameter that corresponds to downlink control information needing to be detected is acquired, a first-type pilot port that corresponds to the downlink control information is determined according to the pilot port determining parameter, that is, user equipment can determine different first-type pilot ports that correspond to multiple pieces of DCI transmitted on a time-frequency resource, and correctly detect the downlink control information according to the first-type pilot ports. Transmission is performed by using different ports, so that multiple pieces of DCI can be spatially multiplexed, thereby improving transmission efficiency.

Figure 5:
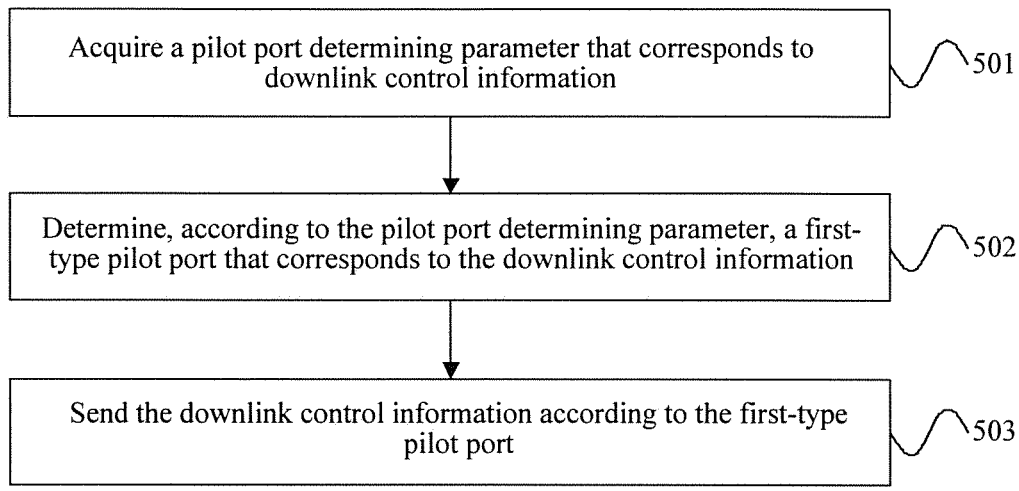
FIG. 5 is a schematic flowchart of Embodiment 1 of a method for sending downlink control information according to the present invention.

FIG. 5 is a schematic flowchart of Embodiment 1 of a method for sending downlink control information according to the present invention. This embodiment is performed by a base station, and the base station may be implemented by using software and/or hardware. As shown in FIG. 5, the method in this embodiment may include:

Step 501: Acquire a pilot port determining parameter that corresponds to downlink control information.

Step 502: Determine, according to the pilot port determining parameter, a first-type pilot port that corresponds to the downlink control information.

Step 503: Send the downlink control information according to the first-type pilot port.

The pilot port determining parameter is determined according to at least one of the following: a format of the downlink control information, a carrier index, configuration information of a second-type pilot, resource configuration information of the downlink control information, and a layer index of the downlink control information.

An application scenario of the method for sending downlink control information provided in this embodiment is similar to the application scenario of the embodiment shown in FIG. 1 to FIG. 3, and details are not described herein again in this embodiment.

In this embodiment, the base station and user equipment determine a first-type pilot port by using a same method, that is, step 501 and step 502 are similar to step 101 and step 102, and details are not described herein again in this embodiment.

In step 503, the base station selects one control channel from candidate physical downlink control channels, and sends the downlink control information to the user equipment by using the selected control channel and a first-type pilot port that corresponds to the control channel, so that the UE can receive downlink data or send uplink data according to the downlink control information.

According to the method for sending downlink control information provided in this embodiment of the present invention, a base station acquires a pilot port determining parameter that corresponds to downlink control information, determines, according to the pilot port determining parameter, a first-type pilot port that corresponds to the downlink control information, and sends the downlink control information according to the first-type pilot port, so that user equipment correctly detect the downlink control information.

In this embodiment, based on the embodiments of FIG. 1 and FIG. 5, a specific method determining the pilot port determining parameter by the user equipment and the base station is described in detail, and a manner of determining the pilot port determining parameter includes the following feasible implementation manners.

In a feasible implementation manner, the pilot port determining parameter is determined according to the format of the downlink control information. Specifically, there are two cases for determining the pilot port determining parameter according to the format of the downlink control information.

Case 1: A type of the downlink control information is determined according to the format of the downlink control information; and the pilot port determining parameter is determined according to the type of the downlink control information.

At least two different types of downlink control information correspond to different pilot port determining parameters.

In a specific implementation process, according to different classification principles, in this embodiment, the type of the downlink control information is classified into a type of uplink scheduling control information and a type of downlink scheduling control information. The uplink scheduling control information is control information for performing uplink scheduling by the user equipment, and the downlink scheduling control information is control information for performing downlink scheduling by the user equipment.

Alternatively, the type of the downlink control information is classified into a type of common control information and a type of user specific control information.

Specifically, in this embodiment, different types of downlink control information correspond to different pilot port determining parameters. For example, a pilot port determining parameter that corresponds to the uplink scheduling control information is 1, and a pilot port determining parameter that corresponds to the downlink scheduling control information is 2. For the common control information and the user specific control information, cases are similar thereto and details are not described herein again in this embodiment.

Case 2: A quantity of bits of the downlink control information is acquired according to the format of the downlink control information; and the pilot port determining parameter is determined according to the quantity of bits of the downlink control information.

In a specific implementation process, if there are at least two pieces of downlink control information needing to be detected, a size relationship between quantities of bits included in the at least two pieces of downlink control information is determined; and the pilot port determining parameter of the downlink control information is determined according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

In another feasible implementation manner, the pilot port determining parameter is determined by using the carrier index, where the carrier index includes: a carrier index of a first carrier on which the downlink control information needing to be detected is located; or, a carrier index of a second carrier scheduled, during cross-carrier scheduling, by the downlink control information that is on the first carrier. Specifically, it may be shown in FIG. 6.

Figure 6:
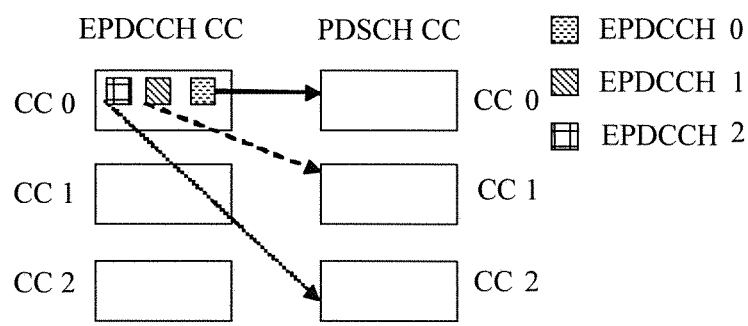
FIG. 6 is a schematic diagram of cross-carrier scheduling according to an embodiment of the present invention.

FIG. 6 is a schematic diagram of cross-carrier scheduling according to an embodiment of the present invention. As shown in FIG. 6, an EPDCCH channel mainly carries DCI of a physical downlink shared channel (Physical Downlink Shared Channel, PDSCH for short). When cross-carrier scheduling is used, uplink-transmission downlink control information or downlink-transmission downlink control information on a first carrier CC0 and/or a second carrier CC1 and a second carrier CC2 is scheduled on the first carrier (carrier) CC0, then CC0 needs to transmit DCI0 (which corresponds to an enhanced physical downlink control channel EPDCCH0) of CC0, DCI1 (which corresponds to an enhanced physical downlink control channel EPDCCH1) of CC1, and DCI2 (which corresponds to an enhanced physical downlink control channel EPDCCH2) on CC2. DCI0, DCI1 and DCI2 may be transmitted on a same CCE by using a manner of spatial multiplexing, but first-type pilot ports need to be distinguished. The pilot port determining parameter may be determined according to the index of the first carrier on which the downlink control information is located and the carrier index of the second carrier scheduled, during cross-carrier scheduling, by the downlink control information that is on the first carrier. For example, a value of the carrier index of the first carrier is 1, and then a value of the pilot port determining parameter may be 1; a value of the carrier index of the second carrier is 2, and then a value of the pilot port determining parameter may be 2; and the like.

In still another feasible implementation manner, the pilot port determining parameter is determined by using the configuration information of the second-type pilot. The configuration information of the second-type pilot includes any one or a combination of the following:
a quantity of ports for the second-type pilot;
power information of the second-type pilot;
a subframe offset at a moment when the second-type pilot is sent; and
a subframe period at the moment when the second-type pilot is sent.

In a specific implementation process, the pilot port determining parameter may be determined according to the quantity of ports for the second-type pilot, power, and a subframe offset and a subframe period of sending.

In this embodiment, the pilot port determining parameter is determined according to any one or a combination of the following: the format of the downlink control information, the carrier index, and the configuration information of the second-type pilot, so that, in various application scenarios, when the base station transmits multiple pieces of DCI of a same user on a time-frequency resource of a same CCE, the user equipment can determine a port determining parameter that corresponds to the pieces of DCI.

In this embodiment, based on the foregoing embodiments, that the user equipment and the base station determine, according to the pilot port determining parameter, the first-type pilot port that corresponds to the downlink control information is described in detail.

In a specific implementation process, the base station or the user equipment determines, according to a formula (1) or a formula (2), a port index of the first-type pilot port that corresponds to the downlink control information, where the formula (1) is:

$$n_1'=n_{ECCE,low} \bmod N_{RB}^{ECCE}+(n_{RNTI}+\Delta)\bmod \min(N_{EPDCCH}^{ECCE},N_{RB}^{ECCE}), \quad (1); \text{and}$$

the formula (2) is:

$$n_1'=(n_0'+\Delta)\bmod \min(N_{EPDCCH}^{ECCE},N_{RB}^{ECCE}), \quad (2); \text{where}$$

$n_0'=n_{ECCE,low} \bmod N_{RB}^{ECCE}+(n_{RNTI})\bmod \min(N_{EPDCCH}^{ECCE},N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which a enhanced physical control channel EPDCCH is located, $N_{RB}^{ECCE}$ is a quantity of ECCEs included in each physical resource block, $n_{RNTI}$ is a value of a radio network temporary identity (Radio Network Temporary Identity, RNTI for short) of user equipment, and $N_{EPDCCH}^{ECCE}$ is a quantity of ECCEs included in the PDCCH.

Optionally, the port determining module 702 is specifically configured to:
determine, according to a formula (1) or a formula (2), a port index of the first-type pilot port that corresponds to the downlink control information, where the formula (1) is:

$$n_1'=n_{ECCE,low} \bmod N_{RB}^{ECCE}+(n_{RNTI}+\Delta)\bmod \min(N_{EPDCCH}^{ECCE},N_{RB}^{ECCE}), \quad (1); \text{and}$$

the formula (2) is:

$$n_1'=(n_0'+\Delta)\bmod \min(N_{EPDCCH}^{ECCE},N_{RB}^{ECCE}), \quad (2); \text{where}$$

$n_0'=n_{ECCE,low} \bmod N_{RB}^{ECCE}+(n_{RNTI})\bmod \min(N_{EPDCCH}^{ECCE},N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

In a specific embodiment, when a value of $\Delta$ is 1, a first-type pilot port that has an aggregation level 2 and is determined by using the formula (1) is not the same as a first-type pilot port occupied by another EPDCCH that has the aggregation level 2 and occupies a different time-frequency resource.

When $n_0'=0$, by using the formula (2), if $n_1'=1$; if $n_0'=1$, $n_1'=0$; if $n_0'=2$, $n_1'=3$; and if $n_0'=3$, $n_1'=2$.

Alternatively, a value of $\Delta$ is 2, and in this case, it can be ensured that ports that correspond to DCI0 and DCI1 are in a frequency division manner.

Specifically, the port index of the first-type pilot port has a correspondence with a port number of the first-type pilot port, and specifically, the correspondence may be shown in Table 1. In Table 1, 107 to 110 represent port numbers separately.

TABLE 1

| | Normal cyclic prefix | | |
|---|---|---|---|
| n' | Normal subframe Special subframe configurations 3, 4, and 8 | Special subframe configurations 1, 2, 6, 7, and 9 | Extended cyclic prefix |
| 0 | 107 | 107 | 107 |
| 1 | 108 | 109 | 108 |
| 2 | 109 | — | — |
| 3 | 110 | — | — |

In this embodiment, multiple pieces of DCI of same user equipment may be transmitted on a same time-frequency resource, and may be spatially multiplexed by using different first-type pilot ports.

Figure 7:
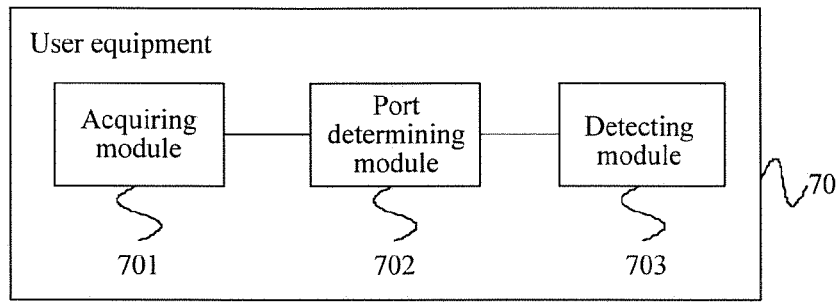
FIG. 7 is a schematic structural diagram of Embodiment 1 of user equipment according to an embodiment of the present invention.

FIG. 7 is a schematic structural diagram of Embodiment 1 of user equipment 70 according to an embodiment of the present invention. As shown in FIG. 7, the user equipment 70 provided in this embodiment of the present invention includes: an acquiring module 701, a port determining module 702, and a detecting module 703.

The acquiring module 701 is configured to acquire a pilot port determining parameter that corresponds to downlink control information needing to be detected.

The port determining module 702 is configured to determine, according to the pilot port determining parameter, a first-type pilot port that corresponds to the downlink control information.

The detecting module 703 is configured to detect the downlink control information according to the first-type pilot port.

The pilot port determining parameter is determined according to at least one of the following: a format of the downlink control information, a carrier index, configuration information of a second-type pilot, resource configuration information of the downlink control information, and a layer index of the downlink control information.

The user equipment provided in this embodiment of the present invention can be configured to perform the technical solution shown in the embodiment of FIG. 1 of the present invention. The implementation principle and technical effects thereof are similar, and details are not described herein again.

Figure 8:
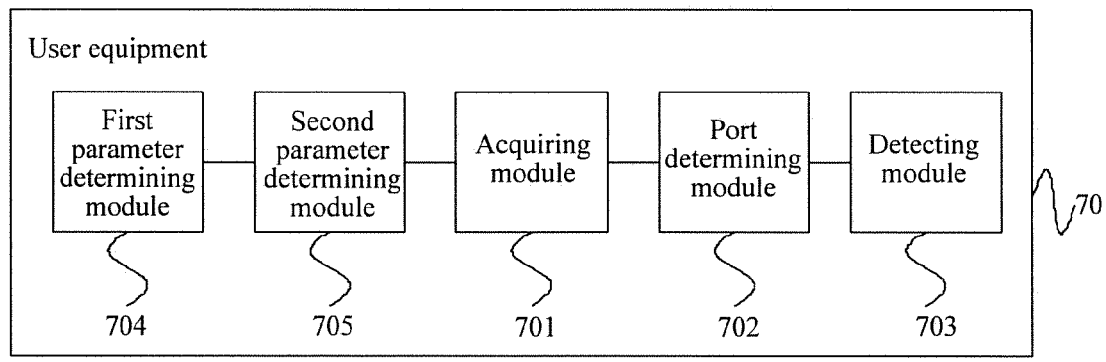
FIG. 8 is a schematic structural diagram of Embodiment 2 of user equipment according to an embodiment of the present invention.

FIG. 8 is a schematic structural diagram of Embodiment 2 of user equipment according to an embodiment of the present invention, and this embodiment is implemented based on the embodiment of FIG. 7, and specifically as follows:

The format of the downlink control information is one of at least one candidate format of the downlink control information.

The carrier index is an index of a carrier scheduled by using the downlink control information.

Optionally, the user equipment 70 further includes: a first parameter determining module 704, configured to: when the pilot port determining parameter is determined according to the format of the downlink control information, determine a type of the downlink control information according to the format of the downlink control information; and determine the pilot port determining parameter according to the type of the downlink control information, where at least two different types of downlink control information correspond to different pilot port determining parameters.

Optionally, the type of the downlink control information includes a type of uplink scheduling control information and a type of downlink scheduling control information; or the type of the downlink control information includes a type of common control information and a type of user specific control information.

Optionally, the user equipment 70 further includes: a second parameter determining module 705, configured to: when the pilot port determining parameter is determined according to the format of the downlink control information, acquire a quantity of bits of the downlink control information according to the format of the downlink control information; and determine the pilot port determining parameter according to the quantity of bits of the downlink control information.

Optionally, the second parameter determining module 705 is further specifically configured to: when there are at least two pieces of downlink control information needing to be detected, determine a size relationship between quantities of bits included in the at least two pieces of downlink control information; and determine the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

Optionally, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

Optionally, the configuration information of the second-type pilot includes any one or a combination of the following:

a quantity of ports for the second-type pilot;

power information of the second-type pilot;

a subframe offset at a moment when the second-type pilot is sent; and a subframe period at the moment when the second-type pilot is sent.

Optionally, the second-type pilot is a channel state information reference signal or a common pilot signal.

Optionally, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

Optionally, the port determining module 702 is specifically configured to:

determine, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0 + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

The user equipment in this embodiment can be configured to perform a technical solution of the method for detecting downlink control information provided in any embodiment of the present invention. The implementation principle and technical effects thereof are similar, and details are not described herein again.

Figure 9:
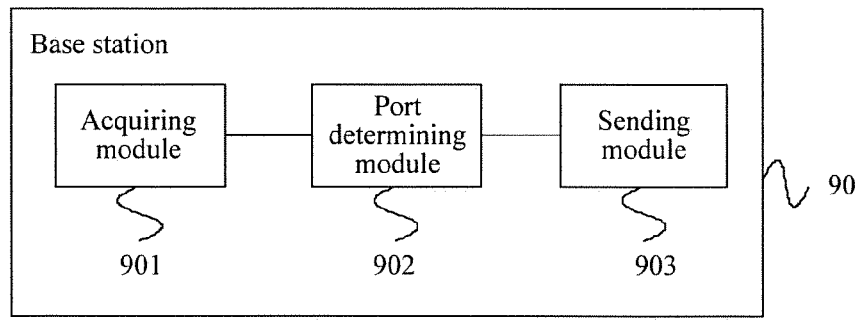
FIG. 9 is a schematic structural diagram of Embodiment 1 of a base station according to an embodiment of the present invention.

FIG. 9 is a schematic structural diagram of Embodiment 1 of a base station 90 according to an embodiment of the present invention. The base station 90 provided in this embodiment includes an acquiring module 901, a port determining module 902, and a sending module 903.

The acquiring module 901 is configured to acquire a pilot port determining parameter that corresponds to downlink control information.

The port determining module 902 is configured to determine, according to the pilot port determining parameter, a first-type pilot port that corresponds to the downlink control information.

The sending module 903 is configured to send the downlink control information according to the first-type pilot port.

The pilot port determining parameter is determined according to at least one of the following: a format of the downlink control information, a carrier index, configuration information of a second-type pilot, resource configuration information of the downlink control information, and a layer index of the downlink control information.

The base station in this embodiment can be configured to perform a technical solution of the method for sending downlink control information provided in the embodiment of FIG. 5 of the present invention. The implementation principle and technical effects thereof are similar, and details are not described herein again.

Figure 10:
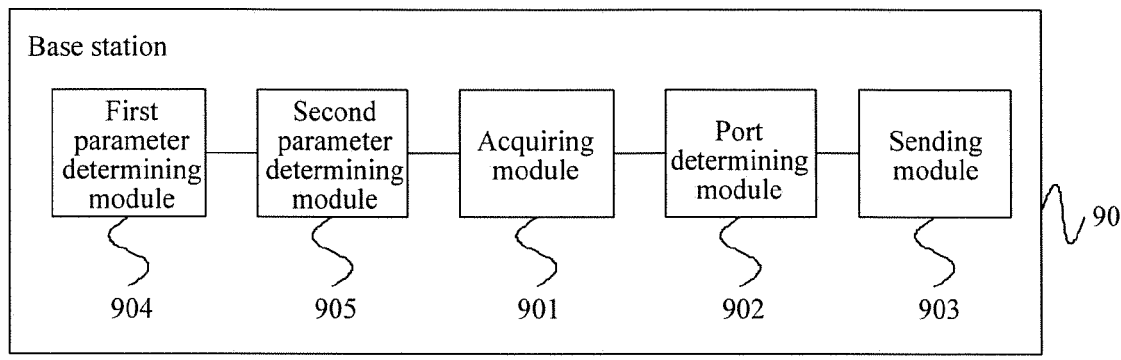
FIG. 10 is a schematic structural diagram of Embodiment 2 of a base station according to an embodiment of the present invention.

FIG. 10 is a schematic structural diagram of Embodiment 2 of a base station according to an embodiment of the present invention, and this embodiment is based on the embodiment of FIG. 9, and specifically as follows:

The format of the downlink control information is one of at least one candidate format of the downlink control information.

The carrier index is an index of a carrier scheduled by using the downlink control information.

Optionally, the base station 90 further includes: a first parameter determining module 904, configured to: when the pilot port determining parameter is determined according to the format of the downlink control information, determine a type of the downlink control information according to the format of the downlink control information; and determine the pilot port determining parameter according to the type of the downlink control information, where at least two different types of downlink control information correspond to different pilot port determining parameters.

Optionally, the type of the downlink control information includes a type of uplink scheduling control information and a type of downlink scheduling control information; or the type of the downlink control information includes a type of common control information and a type of user specific control information.

Optionally, the base station 90 further includes: a second parameter determining module 905, configured to: when the pilot port determining parameter is determined according to the format of the downlink control information, acquire a quantity of bits of the downlink control information according to the format of the downlink control information; and determine the pilot port determining parameter according to the quantity of bits of the downlink control information.

Optionally, the second parameter determining module 905 is further specifically configured to: when there are at least two pieces of downlink control information needing to be detected, determine a size relationship between quantities of bits included in the at least two pieces of downlink control information; and determine the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

Optionally, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

Optionally, the configuration information of the second-type pilot includes any one or a combination of the following:

a quantity of ports for the second-type pilot;

power information of the second-type pilot;

a subframe offset at a moment when the second-type pilot is sent; and a subframe period at the moment when the second-type pilot is sent.

Optionally, the second-type pilot is a channel state information reference signal or a common pilot signal.

Optionally, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

Optionally, the port determining module 902 is specifically configured to:

determine, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

The base station in this embodiment can be configured to perform a technical solution of the method for sending downlink control information provided in any embodiment of the present invention. The implementation principle and technical effects thereof are similar, and details are not described herein again.

Figure 11:
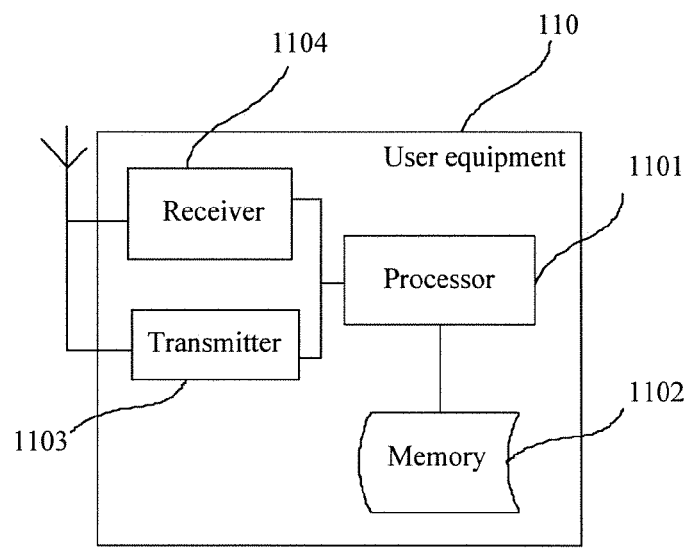
FIG. 11 is a schematic structural diagram of Embodiment 3 of user equipment according to an embodiment of the present invention.

FIG. 11 is a schematic structural diagram of Embodiment 3 of user equipment 110 according to an embodiment of the present invention. As shown in FIG. 11, the user equipment 110 provided in this embodiment includes a processor 1101 and a memory 1102. The user equipment 110 may further include a transmitter 1103 and a receiver 1104. The transmitter 1103 and the receiver 1104 may be connected to the processor 1101. The transmitter 1103 is configured to send data or information, the receiver 1104 is configured to receive data or information, and the memory 1102 stores an execution instruction; when the user equipment 110 runs, the processor 1101 communicates with the memory 1102, and the processor 1101 invokes the execution instruction in the memory 1102 to perform the following operations:

acquiring a pilot port determining parameter that corresponds to downlink control information needing to be detected;

determining, according to the pilot port determining parameter, a first-type pilot port that corresponds to the downlink control information; and detecting the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

Optionally, the format of the downlink control information is one of at least one candidate format of the downlink control information; and the carrier index is an index of a carrier scheduled by using the downlink control information.

Optionally, the pilot port determining parameter is determined according to the format of the downlink control information, and the operations include:

determining a type of the downlink control information according to the format of the downlink control information; and determining the pilot port determining parameter according to the type of the downlink control information, where at least two different types of downlink control information correspond to different pilot port determining parameters.

Optionally, the type of the downlink control information includes a type of uplink scheduling control information and a type of downlink scheduling control information; or the type of the downlink control information includes a type of common control information and a type of user specific control information.

Optionally, the pilot port determining parameter is determined according to the format of the downlink control information, and the operations include:

acquiring a quantity of bits of the downlink control information according to the format of the downlink control information; and determining the pilot port determining parameter according to the quantity of bits of the downlink control information.

Optionally, there are at least two pieces of downlink control information needing to be detected, and the determining the pilot port determining parameter according to the quantity of bits of the downlink control information includes:

determining a size relationship between quantities of bits included in the at least two pieces of downlink control information; and determining the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

Optionally, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

Optionally, the configuration information of the second-type pilot includes any one or a combination of the following:

a quantity of ports for the second-type pilot;

power information of the second-type pilot;

a subframe offset at a moment when the second-type pilot is sent; and a subframe period at the moment when the second-type pilot is sent.

Optionally, the second-type pilot is a channel state information reference signal or a common pilot signal.

Optionally, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

Optionally, the determining, according to the pilot port determining parameter, a first-type pilot port that corresponds to the downlink control information includes:

determining, according to a formula (1) or a formula (2), a port index of the first-type pilot port that corresponds to the downlink control information, where the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

The user equipment in this embodiment can be configured to perform a technical solution of the method for detecting downlink control information provided in any embodiment of the present invention. The implementation principle and technical effects thereof are similar, and details are not described herein again.

Figure 12:
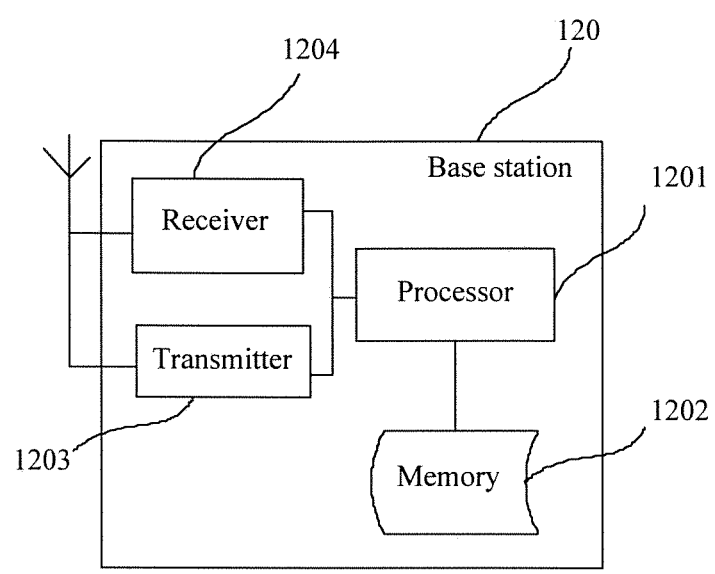
FIG. 12 is a schematic structural diagram of Embodiment 3 of a base station according to an embodiment of the present invention.

FIG. 12 is a schematic structural diagram of Embodiment 3 of a base station 120 according to an embodiment of the present invention. As shown in FIG. 12, the base station 120 provided in this embodiment includes a processor 1201 and a memory 1202. The base station 120 may further include a transmitter 1203 and a receiver 1204. The transmitter 1203 and the receiver 1204 may be connected to the processor 1201. The transmitter 1203 is configured to send data or information, the receiver 1204 is configured to receive data or information, and the memory 1202 stores an execution instruction; when the base station 120 runs, the processor 1201 communicates with the memory 1202, and the processor 1201 invokes the execution instruction in the memory 1202 to perform the following operations:

acquiring a pilot port determining parameter that corresponds to downlink control information;

determining, according to the pilot port determining parameter, a first-type pilot port that corresponds to the downlink control information; and sending the downlink control information according to the first-type pilot port, where the pilot port determining parameter is determined according to at least one of the following: a format of the downlink control information, a carrier index, configuration information of a second-type pilot, resource configuration information of the downlink control information, and a layer index of the downlink control information.

Optionally, the format of the downlink control information is one of at least one candidate format of the downlink control information; and the carrier index is an index of a carrier scheduled by using the downlink control information.

Optionally, the pilot port determining parameter is determined according to the format of the downlink control information, and the operations include:

determining a type of the downlink control information according to the format of the downlink control information; and determining the pilot port determining parameter according to the type of the downlink control information, where at least two different types of downlink control information correspond to different pilot port determining parameters.

Optionally, the type of the downlink control information includes a type of uplink scheduling control information and a type of downlink scheduling control information; or the type of the downlink control information includes a type of common control information and a type of user specific control information.

Optionally, the pilot port determining parameter is determined according to the format of the downlink control information, and the operations include:

acquiring a quantity of bits of the downlink control information according to the format of the downlink control information; and determining the pilot port determining parameter according to the quantity of bits of the downlink control information.

Optionally, there are at least two pieces of downlink control information needing to be detected, and the determining the pilot port determining parameter according to the quantity of bits of the downlink control information includes:

determining a size relationship between quantities of bits included in the at least two pieces of downlink control information; and determining the pilot port determining parameter of the downlink control information according to the size relationship, where a port index determined by using a pilot port determining parameter that corresponds to downlink control information including a larger quantity of bits is greater than a port index determined by using a pilot port determining parameter that corresponds to downlink control information including a smaller quantity of bits; or a port index determined by using a pilot port determining parameter that corresponds to downlink control information including a larger quantity of bits is less than a port index determined by using a pilot port determining parameter that corresponds to downlink control information including a smaller quantity of bits; or downlink control information including a same quantity of bits corresponds to a same pilot port determining parameter.

Optionally, the carrier index includes at least one of the following:

a carrier index of a first carrier on which the downlink control information needing to be detected is located; and a carrier index of a second carrier scheduled, during cross-carrier scheduling, by the downlink control information that is on the first carrier.

Optionally, the configuration information of the second-type pilot includes any one or a combination of the following:

a quantity of ports for the second-type pilot;

power information of the second-type pilot;

a subframe offset at a moment when the second-type pilot is sent; and a subframe period at the moment when the second-type pilot is sent.

Optionally, the second-type pilot is a channel state information reference signal or a common pilot signal.

Optionally, the resource configuration information of the downlink control information includes any one or a combination of the following:

a size of a time-frequency resource of the downlink control information;

a time domain position of a resource of the downlink control information;

a frequency domain position of the resource of the downlink control information; and precoding information used by the downlink control information.

Optionally, the determining, according to the pilot port determining parameter, a first-type pilot port that corresponds to the downlink control information includes:

determining, according to a formula (1) or a formula (2), a port index of the first-type pilot port that corresponds to the downlink control information, where the formula (1) is:

$$n_1'=n_{ECCE,low} \bmod N_{RB}^{ECCE}+(n_{RNTI}+\Delta)\bmod \min (N_{EPDCCH}^{ECCE},N_{RB}^{ECCE}), \quad (1); \text{ and}$$

the formula (2) is:

$$n_1'=(n_0'+\Delta)\bmod \min(N_{EPDCCH}^{ECCE},N_{RB}^{ECCE}), \quad (2); \text{ where}$$

$n_0'=n_{ECCE,low} \bmod N_{RB}^{ECCE}+(n_{RNTI})\bmod \min (N_{EPDCCH}^{ECCE},N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs included in each physical resource block pair, $n_{RNTI}$ is a value of a radio network temporary identity RNTI of user equipment, and $N_{EPDCCH}^{ECCE}$ is a quantity of ECCEs included in the EPDCCH.

The base station in this embodiment can be configured to perform a technical solution of the method for sending downlink control information provided in any embodiment of the present invention. The implementation principle and technical effects thereof are similar, and details are not described herein again.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for detecting downlink control information, the method comprising:
    acquiring a pilot port determining parameter that corresponds to downlink control information needing to be detected, wherein at least two pieces of downlink control information need to be detected;
    determining, according to the pilot port determining parameter, a first-type pilot port that corresponds to the downlink control information; and
    detecting the downlink control information according to the first-type pilot port, wherein the pilot port determining parameter is determined according to at least a format of the downlink control information;
    acquiring a quantity of bits of the downlink control information according to the format of the downlink control information; and
    determining the pilot port determining parameter according to the quantity of bits of the downlink control information by:
        determining a size relationship between quantities of bits comprised in the at least two pieces of downlink control information, and
        determining the pilot port determining parameter of the downlink control information according to the size relationship, wherein:
        a port index determined by using a pilot port determining parameter that corresponds to downlink control information comprising a larger quantity of bits is greater than a port index determined by using a pilot port determining parameter that corresponds to downlink control information comprising a smaller quantity of bits; or
        a port index determined by using a pilot port determining parameter that corresponds to downlink control information comprising a larger quantity of bits is less than a port index determined by using a pilot port determining parameter that corresponds to downlink control information comprising a smaller quantity of bits; or
        downlink control information comprising a same quantity of bits corresponds to a same pilot port determining parameter.

2. The method according to claim 1, wherein:
    the format of the downlink control information is one of at least one candidate format of the downlink control information; and
    a carrier index is an index of a carrier scheduled by using the downlink control information.

3. The method according to claim 2, further comprising:
    determining a type of the downlink control information according to the format of the downlink control information, wherein at least two different types of downlink control information correspond to different pilot port determining parameters.

4. The method according to claim 3, wherein the type of the downlink control information comprises:
    a type of uplink scheduling control information and a type of downlink scheduling control information; or
    a type of common control information and a type of user specific control information.

5. The method according to claim 2, wherein the pilot port determining parameter is also determined according to at least one of the following: the carrier index, configuration information of a second-type pilot, resource configuration information of the downlink control information, and a layer index of the downlink control information.

6. The method according to claim 1, wherein the configuration information of the second-type pilot comprises any one or a combination of the following:
   a quantity of ports for the second-type pilot;
   power information of the second-type pilot;
   a subframe offset at a moment when the second-type pilot is sent; and
   a subframe period at the moment when the second-type pilot is sent.

7. The method according to claim 1, wherein the second-type pilot is a channel state information reference signal or a common pilot signal.

8. A method for detecting downlink control information, the method comprising:
   acquiring a pilot port determining parameter that corresponds to downlink control information needing to be detected;
   determining, according to the pilot port determining parameter, a first-type pilot port that corresponds to the downlink control information by determining, according to a formula (1) or a formula (2), a port index of the first-type pilot port that corresponds to the downlink control information, wherein
   the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$n_0' = n_{ECCE,low} \bmod N_{RB}^{ECCE} + (n_{RNTI}) \bmod \min(N_{EPDCCH}^{ECCE}, N_{RB}^{ECCE})$, $\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs comprised in each physical resource block pair, $n_{RNTI}$ is a value of a radio network temporary identity RNTI of user equipment, and $N_{EPDCCH}^{ECCE}$ is a quantity of ECCEs comprised in the EPDCCH; and
   detecting the downlink control information according to the first-type pilot port, wherein the pilot port determining parameter is determined according to at least one of the following: a format of the downlink control information, a carrier index, configuration information of a second-type pilot, resource configuration information of the downlink control information, and a layer index of the downlink control information.

9. A method for sending downlink control information, the method comprising:
   acquiring a pilot port determining parameter that corresponds to at least two pieces of downlink control information;
   determining, according to the pilot port determining parameter, a first-type pilot port that corresponds to the downlink control information; and
   sending the downlink control information according to the first-type pilot port, wherein the pilot port determining parameter is determined according to at least a quantity of bits of the downlink control information and a size relationship between quantities of bits comprised in the at least two pieces of downlink control information.

10. User equipment, comprising:
    a processor and a memory, wherein the memory is configured to store execution instructions; and
    when the user equipment runs, the processor communicates with the memory, and the processor executes the execution instructions so that the user equipment is configured to:
       acquire a pilot port determining parameter that corresponds to downlink control information needing to be detected, wherein there are at least two pieces of downlink control information needing to be detected,
       determine, according to the pilot port determining parameter, a first-type pilot port that corresponds to the downlink control information,
       detect the downlink control information according to the first-type pilot port, wherein the pilot port determining parameter is determined according to at least a format of the downlink control information,
       acquire a quantity of bits of the downlink control information according to the format of the downlink control information,
       determine the pilot port determining parameter according to the quantity of bits of the downlink control information,
       determine a size relationship between quantities of bits comprised in the at least two pieces of downlink control information; and
       determine the pilot port determining parameter of the downlink control information according to the size relationship, wherein:
          a port index determined by using a pilot port determining parameter that corresponds to downlink control information comprising a larger quantity of bits is greater than a port index determined by using a pilot port determining parameter that corresponds to downlink control information comprising a smaller quantity of bits, or
          a port index determined by using a pilot port determining parameter that corresponds to downlink control information comprising a larger quantity of bits is less than a port index determined by using a pilot port determining parameter that corresponds to downlink control information comprising a smaller quantity of bits, or
          downlink control information comprising a same quantity of bits corresponds to a same pilot port determining parameter.

11. The user equipment according to claim 10, wherein:
    the format of the downlink control information is one of at least one candidate format of the downlink control information; and
    a carrier index is an index of a carrier scheduled by using the downlink control information.

12. The user equipment according to claim 11, wherein when the processor executes the execution instructions the user equipment is configured to:
    determine a type of the downlink control information according to the format of the downlink control information, wherein at least two different types of downlink control information correspond to different pilot port determining parameters.

13. The user equipment according to claim 12, wherein the type of the downlink control information comprises:
    a type of uplink scheduling control information and a type of downlink scheduling control information; or
    a type of common control information and a type of user specific control information.

14. The user equipment according to claim 11, wherein the pilot port determining parameter is also determined according to at least one of the following: the carrier index, configuration information of a second-type pilot, resource configuration information of the downlink control information, and a layer index of the downlink control information.

15. The user equipment according to claim 10, wherein the configuration information of the second-type pilot comprises any one or a combination of the following:
- a quantity of ports for the second-type pilot;
- power information of the second-type pilot;
- a subframe offset at a moment when the second-type pilot is sent; and
- a subframe period at the moment when the second-type pilot is sent.

16. The user equipment according to claim 10, wherein the second-type pilot is a channel state information reference signal or a common pilot signal.

17. User equipment, comprising:
- a processor and a memory, wherein the memory is configured to store execution instructions; and
- when the user equipment runs, the processor communicates with the memory, and the processor executes the execution instructions so that the user equipment is configured to:
  - acquire a pilot port determining parameter that corresponds to downlink control information needing to be detected,
  - determine, according to the pilot port determining parameter, a first-type pilot port that corresponds to the downlink control information,
  - determine, according to a formula (1) or a formula (2), a port index of the first-type pilot port that corresponds to the downlink control information, wherein
  - the formula (1) is:

$$n_1' = n_{ECCE,low} \bmod N_{RB}^{ECCE} + (n_{RNTI} + \Delta) \bmod \min(N_{EPDCCH}^{ECCE}, N_{RB}^{ECCE}), \quad (1); \text{ and}$$

the formula (2) is:

$$n_1' = (n_0' + \Delta) \bmod \min(N_{EPDCCH}^{ECCE}, N_{RB}^{ECCE}), \quad (2); \text{ where}$$

$$n_0' = n_{ECCE,low} \bmod N_{RB}^{ECCE} + (n_{RNTI}) \bmod \min(N_{EPDCCH}^{ECCE}, N_{RB}^{ECCE}),$$

$\Delta$ is the pilot port determining parameter, $\Delta \geq 0$, $\Delta$ is an integer, $n_1'$ is the port index of the first-type pilot port, the port index of the first-type pilot port has a correspondence with a port number of the first-type pilot port, $n_{ECCE,low}$ is a reference sign of a minimum enhanced control channel element ECCE at which an enhanced physical downlink control channel EPDCCH is located, $N_{RB}^{ECCE}$ is a quantity of ECCEs comprised in each physical resource block pair, $n_{RNTI}$ is a value of a radio network temporary identity RNTI of user equipment, and $N_{EPDCCH}^{ECCE}$ is a quantity of ECCEs comprised in the EPDCCH, and

- detect the downlink control information according to the first-type pilot port, wherein the pilot port determining parameter is determined according to at least one of the following: a format of the downlink control information, a carrier index, configuration information of a second-type pilot, resource configuration information of the downlink control information, and a layer index of the downlink control information.

18. A base station, comprising:

a processor and a memory, wherein the memory is configured to store execution instructions; and when the base station runs, the processor communicates with the memory, and the processor executes the execution instructions so that the base station is configured to:
- acquire a pilot port determining parameter that corresponds to at least two pieces of downlink control information,
- determine, according to the pilot port determining parameter, a first-type pilot port that corresponds to the downlink control information, and
- send the downlink control information according to the first-type pilot port, wherein the pilot port determining parameter is determined according to at least a quantity of bits of downlink control information and a size relationship between quantities of bits comprised in the at least two pieces of downlink control information.

* * * * *